United States Patent
Bussey, Jr. et al.

(10) Patent No.: US 6,723,264 B1
(45) Date of Patent: *Apr. 20, 2004

(54) METHOD OF MAKING BIODEGRADABLE PACKAGING MATERIAL

(76) Inventors: Harry Bussey, Jr., 440 Seaview Ct. - Apt. 1812, Tower 4, Marco Island, FL (US) 33937; Buddy Harry Bussey, III, 4 Windy Hill, Atlantic Highlands, NJ (US) 07716

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,771

(22) Filed: Jun. 2, 1997

Related U.S. Application Data

(63) Continuation of application No. 08/405,523, filed on Mar. 16, 1995, now abandoned.

(51) Int. Cl.⁷ .......................... B29C 44/02; B29C 44/20
(52) U.S. Cl. .......................... 264/53; 264/51; 264/148; 264/DIG. 5
(58) Field of Search .................. 264/51, 53, DIG. 5, 264/148

(56) References Cited

U.S. PATENT DOCUMENTS

| | | | | |
|---|---|---|---|---|
| 3,089,857 A | * | 5/1963 | Pottenger | 264/54 |
| 3,137,592 A | * | 6/1964 | Protzman et al. | 127/71 |
| 3,372,215 A | * | 3/1968 | Muirhead et al. | 264/53 |
| 4,263,409 A | * | 4/1981 | Liberti | 264/54 |
| 4,863,655 A | * | 9/1989 | Lacourse et al. | 264/53 |
| 5,000,891 A | * | 3/1991 | Green | 264/53 |
| 5,043,196 A | * | 8/1991 | Lacourse et al. | 264/DIG. 5 |
| 5,116,550 A | * | 5/1992 | Perkins | 264/54 |
| 5,153,037 A | * | 10/1992 | Altieri | 264/DIG. 5 |
| 5,186,990 A | * | 2/1993 | Starcevich | 264/DIG. 5 |
| 5,208,267 A | * | 5/1993 | Neumann et al. | 264/53 |
| 5,242,292 A | * | 9/1993 | Wenger | 425/308 |
| 5,266,368 A | * | 11/1993 | Miller | 264/DIG. 5 |
| 5,272,181 A | * | 12/1993 | Boehmer et al. | 521/84.1 |
| 5,288,765 A | * | 2/1994 | Bastioli et al. | 521/84.1 |
| 5,317,033 A | * | 5/1994 | Motani et al. | 521/79 |
| 5,362,776 A | * | 11/1994 | Barenberg et al. | 524/35 |
| 5,413,855 A | * | 5/1995 | Kolaska et al. | 428/320.2 |
| 5,437,924 A | * | 8/1995 | Decker, III et al. | 428/318.4 |
| 5,464,878 A | * | 11/1995 | Nemphos et al. | 521/50 |

FOREIGN PATENT DOCUMENTS

| | | | | |
|---|---|---|---|---|
| JP | 50 83469 | * | 7/1975 | 264/53 |

* cited by examiner

*Primary Examiner*—Allan R. Kuhns
(74) *Attorney, Agent, or Firm*—Francis C. Hand; Carella, Byrne, Bain et al.

(57) ABSTRACT

The biodegradable acting material is made from starch with various additives such as nucleators and plasticizer. The blowing agent used for foaming of the starch material may be alcohol or water. The material is made by mixing a charge of starch, nucleator and plasticizer to form a flowable mass which is then injected on the fly with the blowing agent, i.e. alcohol and/or water. Thereafter, the flowable mass is extruded through a dye and is either cooled to form a latent-foaming material or is allowed to expand into a foamed state. The starch which is used may be a corn starch, potato starch or the like.

21 Claims, No Drawings

METHOD OF MAKING BIODEGRADABLE PACKAGING MATERIAL

This is a continuation of application Ser. No. 08/405,523 filed on Mar. 16, 1995, now abandoned.

This invention relates to a method of making biodegradable packaging material and packaging elements made thereby.

As is known, various techniques have been employed to manufacture loose fill packaging elements of thermoplastic materials, such as polystyrene and polyethylene materials. For example, it has been known to place a charge of a thermoplastic resin, such as polystyrene, in pellet form into an extruder at a feed point and to thereafter heat the pellets into a molten state in order to obtain a flowable molten mass. In addition, it has been known to add a blowing agent such as a hydrocarbon at a point of the extruder, for example in a mixing zone, and to mix the blowing agent into the molten mass of plastic to obtain a homogeneous flowable mass. This mass is subsequently extruded through one or more openings in a die to obtain a particular cross-sectional shape. In some cases, the extrudate is quickly cooled such as by quenching in water so that the extrudate retains a latent foaming state. The cooled extrudate is then cut into small pellets which can be subsequently packaged and shipped to a remote location where the pellets can be heated into an expanded state.

In an alternative technique, the extrudate can be allowed to expand upon extruding from the die of the extruder directly into a foamed expanded state. The foamed extrudate can then be cut into predetermined lengths to form a conventional-size packaging element.

From an ecological standpoint, loose fill packaging elements made solely of plastic materials tend to have a long life, particularly, when buried in land fills or other similar types of waste dumps. Accordingly, attempts have been made to fabricate thermoplastic elements, such as packaging materials and the like, in a fashion which permits degradability over relatively short periods of time. To this end, suggestions have been made to incorporate ingredients, such as corn starch into the thermoplastic elements in order to enhance biodegradability.

Accordingly, it is an object of the invention to reduce the costs of making biodegradable packaging material.

It is another object of the invention to provide a loose fill packaging element of unique construction which is capable of biodegrading in a relatively short time.

It is another object of the invention to provide a relatively simple technique for manufacturing biodegradable loose fill packaging elements of non-thermoplastic materials and other foam products, e.g. foam sheet, rod, plank, tubing and the like.

Briefly, the invention provides a packaging material which is made basically of a starch and which employs additives including a nucleator and a plasticizer, such as mineral oil.

The starch packaging material may be manufactured in a latent-foaming state in which the material is less biodegradable. However, when the material is heated and expanded into an expanded state, the expanded starch is rendered more readily biodegradable when exposed to the environment. In this respect, in the latent form, there is little internal oxygen present in the starch packaging material but when expanded, each cell within the material will contain oxygen allowing a biodegradable process in conjunction with the outside environment to commence more rapidly. Biodegradability will occur more rapidly as each cell wall is surrounded by oxygen and as each cell wall becomes extremely thin during expansion. Biodegradability is particularly enhanced in the present of moisture. In this respect, the more moisture, the faster the material will decompose.

The method of making the biodegradable material, e.g. in the form of loose fill packaging elements, comprises; an initial step of mixing and heating a charge of a starch, for example, a corn starch, a nucleator and a plasticizer, if necessary to form a flowable mass. Thereafter, a blowing agent, such as an alcohol or water, is injected into and mixed with the heated flowable mass on the "fly" to form a homogeneous mass which is then extruded through a die to form at least one continuous extrudate. This extrudate is then cooled to limit expansion and the cooled extrudate is then cut into individual pellets having a latent-foaming characteristic. Alternatively, the extrudate can be allowed to expand (i.e. foam) after leaving the die and can then be cut into expanded elements of a size suitable for loose fill packaging or other foam items, such as, sheet, rod, plank, tubing and the like.

The pellets may be handled in the latent foaming state and shipped in a conventional manner to a user. Thereafter, the pellets can be heated in order to foam the pellets into foamed biodegradable packing elements.

The starch used to make the packaging elements is typically pure corn starch but may be any other suitable starch, such as a potato starch and the like.

The nucleator may be a mixture of citric acid and bicarbonate of soda, e.g. a mixture sold under the trademark HYDROCERAL®. In the alternative, talcum powder may be used as a nucleator.

The blowing agent which is used, may for example, be an alcohol, such as glycol, or may be water. The amount of blowing agent added to the starch mass controls the amount of expansion of the mass. In this respect, the more the blowing agent, the greater the expansion up to, of course, a blow out condition in which there is an excess of blowing agent. Further, the amount of blowing agent injected can be adjusted during an extrusion process, i.e. on the fly rather than on a batch basis.

Typically, the starch which is used is a starch which contains sufficient water to bring about a flowable mass of the mixed ingredients under the heat and pressure of a conventional extruder.

The use of corn starch and the nucleator allows curing to be performed at a fast rate. Hence, the storage costs of the loose fill product can be reduced. Similarly, the product can be shipped faster. Also, the product can be put into packages and placed in stock at a faster rate.

The use of starch also renders the product biodegradable after expansion of the pellets into the foamed state. As noted above, biodegradability of the product from the latent state to the expanded state is enhanced, e.g. by a factor of about fifty after expansion. The reason for this appears to be that is little internal oxygen present in the latent form state whereas in the expanded (foamed) state, each cell will contain oxygen allowing a biodegradable process to occur in conjunction with the environment. The thinness of the cell walls also enhances the biodegradable characteristic of the expanded elements particularly since degrading occurs from the outside towards the inside of the element especially in the presence of water.

These and other objects and advantages of the invention will become more apparent from the following detailed description.

Typically, the conventional method of making a thermoplastic loose fill packaging element employs an extruder of conventional construction to extrude a homogeneous mass of material. For example, extruders have been made of twin screw type and single screw type. In the case of single screw extruders, a length to diameter (L/D) ratio of from 10 to 1 up to 20 to 1 have been used. In attempting to use simply a starch based resin material with a conventional blowing agent to form loose fill packaging elements, it has been found that for a shorter length to diameter ratio extruder, such as with a Maddox or an American extruder, the process is erratic and it is difficult to extrude quality loose fill packaging elements. Even with a longer length to diameter ratio and the use of a twin screw extruder, the difficulty of extrusion arises because of the lack of control of the material as the material passes through the extruder.

It has been found that even though a machine controls temperature and cooling, the material and the blowing agent are erratic. For example, the cell structure is large and not consistent as boiling of the blowing agent (for example, water turning into steam) creates varying pressures according to the heat derived from the shear of the screw in the barrel of the extruder. In such a case, there is nothing to help plasticize the starch and control cell structure.

In accordance with the invention, a starch, such as, corn starch is used as the main ingredient and alcohol, e.g. glycol, or water is used as a blowing agent. In addition, a plasticizer is used along with a nucleator, such as citric acid in combination with bicarbonate of soda. These ingredients serve to obtain a smaller and even cell structure.

The alcohol and the water which is inherent within the starch mix easily as alcohol and water are soluble. In addition, both alcohol and water will mix with the starch. The use of alcohol has been found to make the finished starch product more resilient.

It has been found that an ideal amount of water is about from 5% to 20% by weight of the starch for blowing or foaming of the starch and with a preferable range of from 15% to 17% by weight of the starch. A solution of 10% water and from 5% to 7% alcohol provides a more even amount of expansion and will allow the finished product to cool faster due to the fast evaporation of the alcohol. This also reduces the collapsing of the loose fill elements or the cells in the loose fill elements.

Once the loose fill has foamed to the utmost, it is important to cool the expanded elements quickly.

When using a nucleator, such as citric acid and bicarbonate of soda, which causes a smaller and more even cell structure, the resiliency of the final loose fill elements is enhanced. In this respect, citric acid and bicarbonate of soda, when heated, cause carbon dioxide ($CO_2$) to form, which then spreads in the homogenized melt to form weak spots in which the blowing agent can form cells. The more weak spots, the finer or smaller the cell structure. If there is too much citric acid and bicarbonate of soda added, the foaming or expansion will be uncontrollable.

The various ingredients noted above will allow less expensive and lower grade starches to be used and will also act as an extrusion aid to smooth out the whole process. These ingredients also permit shorter length to diameter extruders to be used.

The extruder used may have a longer length to diameter ratio in order to accommodate a two-stage design screw. Typically, the extruder has a feed section, a compression section and a metering section. These are followed by a restriction, a low pressure zone and a mixing zone. The blowing agent, i.e. alcohol or glycol, is injected in the low pressure zone and at the beginning of the mixing zone. After the mixing zone, a feed section and a compression and metering section are incorporated in the extruder in order to permit the mixture to be extruded through a die into atmosphere where the mixture expands and foams to its utmost under the pressure of the water (steam), alcohol (e.g. glycol) and the carbon dioxide from the citric acid and bicarbonate of soda within the extrude.

It has been found that the density range of the expanded extrudate ranges from 0.2 to 1 pound per cubic foot.

The same process can be performed in order to make a latent foaming material. In this case, the heat within the extruder is controlled in order to keep the water and alcohol (e.g. glycol) and citric acid and bicarbonate of soda from boiling upon exiting from the die. In this case, a simple extruder may be used.

The latent starch foam is denser and heavier and can be shipped for greater distances than foamed products. In this respect, the latent starch foam extrudate may be as dense as from 10 to 40 pounds per cubic foot or more.

The starch extrudate may be extruded in various states, for example, as foam and starch blocks, starch sheets, starch rods and the like.

The varying of the alcohol and the citric acid and bicarbonate of soda will give many qualities such as resiliency and light density. A preferred mixture is made of 10% water, 7% alcohol, 1/10 of 1% (0.1%) of citric acid and bicarbonate of soda.

By adding ½ of 1% of citric acid and bicarbonate of soda to the formula, the water and/or the alcohol can be reduced and still retain the resilience and density with smaller cell structure.

Improvements in resilience can also be accomplished by changing the water-alcohol or glycol-citric acid and bicarbonate of soda ratio as required.

Resilience, density and skin smoothness will be achieved by adjustments from the ratios described above. For example, a ratio of water to alcohol may vary from 4 to 1 through 1 to 10 with citric acid and bicarbonate of soda going from 1/10 of 1% to 10% of total material weight. The alcohol and water can be as high as 22% and higher by being restricted only by the consistency effecting the extrusion and the temperature of the extruder. That is, for the same amount of blowing agent, the temperature of the extruder is usually lower where producing a latent foaming extrudate while being higher where a foamed extrudate is being produced.

The method of making biodegradable loose fill packaging elements comprises the steps of mixing a charge of starch, a nucleator and, if necessary a plasticizer such as mineral oil to form a mass, for example, in a feed section of an extruder.

The nucleator may also include citric acid and bicarbonate of soda.

Thereafter, the mass is heated to a temperature of from 150° F. to 300° F. to form a flowable mass within a compression section of the extruder.

Thereafter, a blowing agent, such as alcohol or water, is injected into the heated flowable mass, in a low pressure zone of the extruder and before the beginning of the mixing zone of the extruder. Injection may be accomplished by means of a metering pump and a flow control valve which can be adjusted to any condition desired.

The heated flowable mass is then extruded, for example, through a die, into at least one continuous extrudate. This extrudate is then cooled to limit expansion and subsequently cut into individual pellets. These pellets may then be stored and subsequently expanded under heat in order to form foamed biodegradable packing elements.

The method of making a latent foaming loose package material follows the same steps as above terminating with the cutting of the extrudate into pellets after cooling.

Alternatively, the extrudate may be allowed to foam on exiting the extruder to a desired state. Thereafter, the foamed extrudate may be cut into pellets or individual packing elements.

One of the advantages of the method of making the starch-based bio-degradable packaging elements is that the injection of the blowing agent can be accomplished "on the fly". That is, adjustments in the amount of blowing agent can be made as the extruding machine is operating in order to obtain the product desired. In this respect, as is known, the starch material which is used in the process contains water and can absorb or release water (i.e. dry out) from day-to-day. Hence, depending upon the time of day that the starch material is fed into the extruder, the starch may contain more or less water. This would have a direct effect on the degree of foaming of the material when extruded. However, in accordance with the invention, one may visually detect the product during extrusion from the extruder and if the amount of foaming is not sufficient, the amount of blowing agent which is injected can be increased. Likewise, if there is excessive foaming, the amount of blowing agent injected can be reduced in order to bring the product to the desired foamed state.

By way of example, depending upon the size of the extruder, a typical run for the extruder would be in the range of from 200 pounds per hour to 1,000 pounds per hour of starch.

Since the blowing agent can be injected on the fly to control the foaming of the extrudate, there is no need to have the starch stored under strict storage controls. This also avoids the need for atmospheric testing devices as well as mixing devices in which the water content of the starch is brought to any desired amount.

Generally, the amount of blowing agent to be added will depend, in part, on the amount of moisture in the beginning starch. Typically, where the blowing agent is an alcohol, the amount of alcohol added may be in the range of from 1% to 20% by weight of the starch. A preferable range is from 5% to 7%, as in the example given above.

It is also possible to prepare the starch in a dehydrated form so that there is little or no moisture in the starch prior to being fed into an extruder. In this case, where the blowing agent is an alcohol, the amount of blowing agent added may range from 1% to 20% by weight of the dehydrated starch. Where more blowing agent is added, the extrudate is more resilient and less rigid. Such extrudates may be used to form structural foams.

The invention thus provides a relatively simple process for making biodegradable packaging material. Further, the invention provides a packing material which is capable of biodegrading in a relatively short time, particularly in the presence of moisture.

What is claimed is:

1. In a method of making biodegradable packaging elements, the steps of
    heating a mass of starch having a water content of from 5% to 20% by weight of said starch to a temperature of from 150° F. to 300° F. to form a flowable mass;
    injecting an alcohol as a blowing agent into the heated flowable mass with a ratio of water to alcohol in a range from 4 to 1 and 1 to 10 by weight; and
    then extruding the heated flowable mass into at least one continuous extrudate.

2. In a method as set forth in claim 1 the steps of
    cooling the extrudate to limit expansion thereof; and
    cutting the cooled extrudate into individual pellets to form latent foaming biodegradable packing elements.

3. In a method as set forth in claim 1 which further comprises the step of mixing a nucleator in an amount of from 0.1% to 10% of total material weight into said mass prior to said step of heating.

4. In a method as set forth in claim 3 wherein said nucleator is a mixture of citric acid and bicarbonate of soda.

5. In a method as set forth in claim 1 wherein said alcohol is in an amount of from 1% to 20% by weight of said starch.

6. In a method as set forth in claim 5 wherein said alcohol is glycol.

7. In a method as set forth in claim 1 wherein the heated flowable mass is extruded on a continuous basis and the blowing agent is injected into the mass in a selectively controlled manner in dependence on the degree of foaming of the extrudate.

8. In a method of making a latent foaming packaging material, the steps of
    mixing a charge of starch having a water content of 10% by weight of said starch and a nucleator in an amount of 0.1% by weight and including citric acid and bicarbonate of soda to form a mixture;
    heating the mixture to a temperature of from 150° F. to 300° F. to form a molten flowable mass;
    injecting alcohol as a blowing agent in an amount of 7% into the molten mass;
    then extruding the molten mass into at least one continuous extrudate;
    cooling the extrudate to limit expansion thereof; and
    cutting the extrudate into latent foaming pellets.

9. In a method of making biodegradable packaging material comprising the steps of
    placing a mass of dehydrated starch in an extruder;
    heating said mass to a temperature of from 150° F. to 300° F.;
    injecting an alcohol as a blowing agent in an amount of from 1% to 20% by weight of said dehydrated starch into said heated mass of starch; and
    extruding the heated mass into at least one continuous extrudate.

10. A method as set forth in claim 9 which further comprises the step of adding a nucleator to effect formation of small cells in said extrudate.

11. A method as set forth in claim 10 which further comprises the step of adding a plasticizer to the heated mass prior to said step of injecting said blowing agent.

12. A method as set forth in claim 9 which further comprises the step of adding a nucleator formed of citric acid and bicarbonate of soda in an amount of at least 0.1% by weight of said starch to said mass prior to injection of said blowing agent.

13. A method as set forth in claim 9 wherein said starch is corn starch.

14. In a method of making latent foaming biodegradable packaging elements, the steps of
    heating a mass of starch in an extruder to form a heated flowable mass;
    injecting water as a blowing agent into the heated flowable mass in the extruder;
    then extruding the heated flowable mass through a die into at least one continuous extrudate;
    controlling the heat within the extruder to keep said water from boiling upon exiting through the die to limit expansion of the extrudate;
    cooling the extrudate; and cutting the cooled extrudate into individual pellets to form latent foaming biodegradable packing elements.

15. In a method as set forth in claim 14 which further comprises the step of mixing a nucleator in an amount of from 0.1% to 10% of total material weight into said mass prior to said step of heating.

16. In a method as set forth in claim 15 wherein said nucleator is a mixture of citric acid and bicarbonate of soda.

17. In a method as set forth in claim 14 wherein the heated flowable mass is extruded on a continuous basis and the blowing agent is injected into the mass in a selectively controlled manner in dependence on the degree of foaming of the extrudate.

18. In a method as set forth in claim 14 wherein said starch has a water content of from 5% to 20% by weight of said starch.

19. In a method as set forth in claim 18 wherein said water is in an amount of 15% to 17% by weight of said starch.

20. A method as set forth in claim 14 which further comprises the step of adding a plasticizer to the heated mass prior to said step of injecting said blowing agent.

21. In a method as set forth in claim 14 wherein the mass of starch is heated to a temperature of from 150° F. to 300° F.

* * * * *

UNITED STATES PATENT AND TRADEMARK OFFICE
CERTIFICATE OF CORRECTION

PATENT NO. : 6,723,264 B1
DATED : April 20, 2004
INVENTOR(S) : Harry Bussey, Jr. et al.

Page 1 of 1

It is certified that error appears in the above-identified patent and that said Letters Patent is hereby corrected as shown below:

<u>Column 8,</u>
Line 12, add: Claim
22. In a method of making biodegradable packaging material comprising the steps of
    placing a mass of starch in an extruder;
    heating said mass to a temperature of from 150°F to 300°F;
    adding a plasticizer to the heated mass;
    thereafter injecting water as a blowing agent in an amount of up to 20%
by weight of said starch into said heated mass of starch; and
    extruding the heated mass into at least one continuous extrudate.

Signed and Sealed this

Twenty-fifth Day of October, 2005

JON W. DUDAS
*Director of the United States Patent and Trademark Office*